United States Patent [19]

Tyrer et al.

[11] Patent Number: 5,048,964
[45] Date of Patent: Sep. 17, 1991

[54] PHASE-STEPPING INTERFEROMETRY

[75] Inventors: John R. Tyrer, Ratcliffe on the Wreake; Fernando Mendoza-Santoyo, Loughborough; David Kerr, Hathern, all of England

[73] Assignee: National Research Development Corporation, London, England

[21] Appl. No.: 469,480
[22] PCT Filed: Sep. 4, 1989
[86] PCT No.: PCT/GB89/01030
§ 371 Date: Apr. 11, 1990
§ 102(e) Date: Apr. 11, 1990
[87] PCT Pub. No.: WO90/02930
PCT Pub. Date: Mar. 22, 1990

[30] Foreign Application Priority Data

Sep. 2, 1988 [GB] United Kingdom ............... 8820761

[51] Int. Cl.$^5$ .............................................. G01B 9/02
[52] U.S. Cl. ................................... 356/360; 356/347; 73/657
[58] Field of Search ...................... 356/347, 354, 360; 73/656, 657

[56] References Cited

U.S. PATENT DOCUMENTS 3,694,088  9/1972  Gallagher et al.
3,772,457  11/1973  Macovski ........................... 356/360
3,828,126  8/1974  Ramsey ............................... 73/656
4,583,855  4/1986  Bareket .

FOREIGN PATENT DOCUMENTS 2076558  12/1981  United Kingdom .

OTHER PUBLICATIONS

Applied Optics, vol. 26, No. 6, 15 Mar. 1987 (New York, N.Y., US), C. Ai et al: "Effect of Piezoelectric Transducer Nonlinearity on Phase Shift Interferometry", pp. 1112-1116.
Tyrer et al., "Use of High Resolution Real-Time Image Processing Techniques in Generation and Analysis of ESPI Fringe Patterns", Opt. Lasers Eng. (UK), vol. 8, No. 1988, pp. 109-121.
Tyrer et al., "The Application of Phase Stepping to the Analysis of ESPI Fringe Patterns", Proc. SPIE Int Soc. Eng., vol. 814, part 1, 1988, pp. 379-389.

Primary Examiner—Samuel Turner
Attorney, Agent, or Firm—Cushman, Darby & Cushman

[57] ABSTRACT

An interferometric procedure, such as electronic speckle pattern interferometry, involves generating two signals representing the point-by-point variations in intensity of respective patterns of electromagnetic radiation resulting from the interference of first and second beams of such radiation derived from a coherent source, with at least the first beam from each pattern being scattered, before interference with its respective second beam, from a common object surface, and with a corresponding pair of the beams, one for each pattern, having a predetermined relative phase difference of other than a multiple of $\pi$; and determining from the two signals values for a datum phase of the radiation at the object surface. Preferably, as a preliminary to this last determination. DC components are removed from the two signals. Conveniently, to simplify the determination, the phase difference is an odd multiple of $\pi/4$ or $\pi/2$.

11 Claims, 1 Drawing Sheet

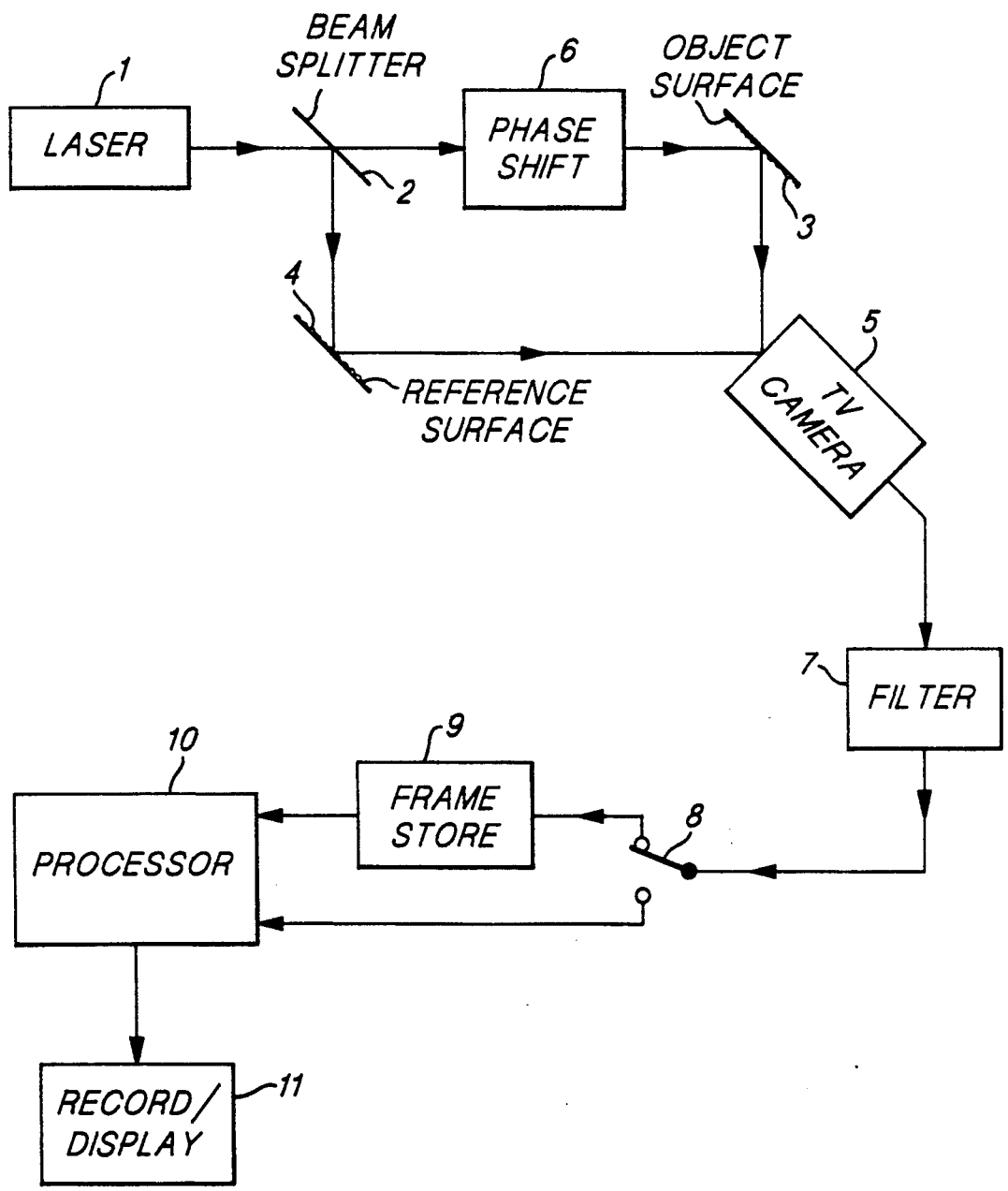

PHASE-STEPPING INTERFEROMETRY

The present invention has been conceived and developed for extracting phase information in electronic speckle pattern interferometry, or so-called ESPI, by the phase-stepping technique and it is convenient to describe the invention in this context. However, it is to be understood that the invention is applicable to other forms of interferometry for which the phase-stepping technique is appropriate.

This technique involves successively changing the phase of one of the interferometer beams from a datum phase $\phi$ by $2\pi/k$ in $(k-1)$ equal steps and recording the respective interference pattern images generated at each different phase. The Fourier series coefficients for the datum phase are then given by the expressions $$\alpha_1(x,y) = \sum_{N=1}^{k} I_N(x,y)\cos(2\pi N/k)$$

and $$\beta_1(x,y) = \sum_{N=1}^{k} I_N(x,y)\sin(2\pi N/k)$$

where N is the image number in the phase-stepping sequence and $I_N(x,y)$ is the image pixel intensity. A solution for $\phi(x,y)$ is then given, in turn, by the expression $$\tan^{-1}(\beta_1(x,y)/\alpha_1(x,y))$$

However, the technique is not without practical difficulties.

For a given image resolution, image recording and related equipment needs increase with k and so also, in general terms, will the time taken for computation by virtue of the increased number of pieces of data involved in the expressions to be evaluated.

At the same time, the environmental sensitivity of the optical instrumentation can drift and introduce error in $I_N$ as k increases.

In practice these difficulties are such that the technique is usually deployed with k equal to 3 or 4, when evaluation is respectively given by $$\phi(x,y) = \tan^{-1} \frac{\sqrt{3(I_1 - I_2)}}{(2I_3 - I_1 - I_2)}$$

and $$\phi(x,y) = \tan^{-1} \frac{(I_1 - I_3)}{(I_4 - I_2)}$$

When k is 3 the expression to be evaluated is computationally more complex than that for k equal to 4, but environmental sensitivity is higher. Higher values of k are relatively impracticable by virtue of greatly increased equipment cost and/or complexity plus poor sensitivity.

Clearly this situation is such that the case when k is 2 appears particularly attractive. However, in this case it will be seen that $\beta_1$ is zero.

An object of the present invention is to reduce the difficulties of the above situation and to this end there is provided an interferometric method comprising, and related apparatus for, generating two signals representing the point-by-point variations in intensity of respective patterns of electromagnetic radiation resulting from the interference of first and second beams of such radiation derived from a coherent source, with at least the first beam for each pattern being scattered, before interference with its respective second beam, from a common object surface, and with a corresponding pair of the beams, one for each pattern, having a predetermined relative phase difference of other than a multiple of $\pi$; and determining from said two signals values for a datum phase of the radiation at said surface.

The derivation of the invention can be explained by considering, for ESPI, the case for k equal to 3 to produce images at phases $\phi - \delta$, $\phi$ and $\phi + \delta$. These images can be expressed in a simplified manner by the equations $$I_1 = I_O + I_R + 2\sqrt{I_O I_R} \cos(\phi - \delta) \quad (1)$$

$$I_2 = I_O + I_R + 2\sqrt{I_O I_R} \cos \phi \quad (2)$$

$$I_3 = I_O + I_R + 2\sqrt{I_O I_R} \cos(\phi + \delta) \quad (3)$$

Included in these equations are DC components $I_O$ plus $I_R$ contributed by the object and reference beams producing the images. Elimination of these components, such as by selective frequency filtering or substraction, allows further simplification effectively to represent a situation where k is 2 by forming from only two of the equations an expression for $\phi$.

Thus from equations (1) and (2), $\phi$ is given by $$\tan^{-1}\left(\frac{I_1}{I_2} - \cos\delta\right)/\sin\delta$$

and if $\delta$ is chosen for convenience as $\pi/2$ or an odd multiple thereof, this expression is further simplified to $$\tan^{-1} \pm I_1/I_2$$

A corresponding result is obtainable from equations (2) and (3).

From equations (1) and (3), $\phi$ is given by $$\tan^{-1}\frac{(I_1 + I_3)}{(I_1 - I_3)} \cot \delta$$

and if $\delta$ is chosen for convenience as $\pi/4$, or an odd multiple thereof, cot $\delta$ equals $\pm 1$.

For further clarification the accompanying drawing schematically illustrates, by way of example, one embodiment of electronic speckle pattern interferometric apparatus according to the invention.

The illustrated apparatus comprises a coherent light source, laser 1, which projects a beam by way of a beam splitter 2 to an object surface 3 of interest and a reference surface 4, with a television camera 5 or equivalent equipment serving to image light scattered from both surfaces and provide a video signal output representing the relevant image. A phase shifter 6 is located in the beam path from the beam splitter to one of the surfaces 3 and 4, this shifter being of electro-optical or other form selectively operable to effect a predetermined phase shift within the relevant beam portion. The video signal is applied through a filter 7, operable to remove DC components, and then a switch 8, operable in synchronism with the phase shifter to pass alternate ones of a succession of video signals to a frame store 9. A successive pair of video signals are passed, one from the store and one directly by the switch, to a processor 10, with the processor output being passed to an output unit 11 for the purposes of recordal and/or display.

The phase shifter will be operable to effect a relative phase shift of $\delta$ or $2\delta$, video signals representing images formed respectively with and without this shift will be passed as parallel inputs to the processor by different ones of the routes through the frame store or not, and the processor will determine pixel-by-pixel from these inputs, output values for a datum phase $\phi$ on the basis of the earlier discussion of the invention above. Thus, if the relative phase shift is $\delta$ the determination follows that for equations (1) and (2) or (2) and (3), while if the shift is $2\delta$ the determination follows that for equations (1) and (3).

It will be noted that phase shifting can be effected in respect of the beam portion incident on the object surface or reference surface, but not both. Also the beam can be generated in continuous or pulsed manner with, in the latter case, phase shifting and frame store input switching being suitably synchronised with the pulse timing. Furthermore, to the extent that the datum phase determination is effectively absolute, there need be no change in condition for the object surface, such as caused by deformation or other movement, as is commonly the case for electronic speckle pattern interferometry, although the invention is of course applicable to such situations.

From this clarification it will be seen that the invention provides a basis for improved phase-stepping interferometry or apparatus therefor involving a single phase change step, simplified equipment and computation, and enhanced sensitivity. Moreover, as noted initially above, while conceived and developed for electronic speckle pattern interferometry, the invention is more generally applicable to interferometric procedures and apparatus involving coherent light or other electromagnetic radiation and for which the phase-stepping technique is appropriate, such as holographic interferometry.

We claim:

1. An interferometric method comprising: generating two signals representing point-by-point variations in intensity of respective patterns of electromagnetic radiation resulting from an interference of first and second beams of such radiation derived from a coherent source, with at least the first beam for each pattern being scattered, before interference with its respective second beam, from a common object surface, and with a corresponding pair of the beams, one for each pattern, having a predetermined relative phase difference of other than an integer multiple of $\pi$; and determining, from said two signals alone, values for a datum phase of the radiation at said surface.

2. A method according to claim 1 wherein, as a preliminary to said datum phase value determination, DC components are removed from said two signals.

3. A method according to claim 1 or 2 wherein said phase difference is an odd multiple of $\pi/2$.

4. A method according to claim 3 wherein each of said corresponding pair of beams has a phase difference which is the same odd multiple of $\pi$ relative to said datum phase but of mutually opposite sense.

5. A method as in claim 3, wherein said determining step includes the steps of:

obtaining equations representing said two signals, such that $$\phi = \tan^{-1}\left(\frac{I_1}{I_2} - \cos\delta\right)/\sin\delta,$$

such that when $\delta$ is an odd multiple of $\pi/2$, $$\phi = \tan^{-1} \pm I_1/I_2; \text{ and}$$

solving said equations for said datum phase.

6. A method as in claim 1, wherein said determining step includes the steps of:

obtaining equations representing said two signals, in a way that a phase shift amount becomes $\pm 1$; and solving said equations for said datum phase.

7. A method according to claim 1 wherein said radiation is light.

8. Interferometric apparatus comprising:

means for generating a first signal representing point-by-point variations in intensity I of a pattern of electromagnetic radiation resulting from an interference of first and second beams of such radiation derived from a coherent source, with at least the first beam being scattered from an object surface before interference with the second beam;

means for changing the phase of one of said first and second beams by an amount $\delta$ other than an integer multiple of $\pi$ to generate a second signal in like manner to said first signal;

means for removing DC components from said first and second signals; and means, responsive only to said first and second signals following DC component removal, to evaluate a datum phase $\phi$ by solving two equations of three in the form $I = \cos(\phi - \delta)$, $\cos\phi$ and $\cos(\phi + \delta)$.

9. Apparatus according to claim 8 comprising means for storing at least one of said first and second signals.

10. Apparatus according to claim 8 or 9 wherein said source is of laser form.

11. An apparatus as in claim 8, wherein said evaluating means evaluates equations representing said two signals, including $$\phi = \tan^{-1}\left(\frac{I_1}{I_2} - \cos\delta\right)/\sin\delta,$$

such that when $\delta$ is an odd multiple of $\pi/2$, $\phi = \tan^{-1} \pm I_1/I_2$; and solves said equation for said datum phase.

* * * * *